(12) United States Patent
Xu et al.

(10) Patent No.: US 6,781,853 B2
(45) Date of Patent: Aug. 24, 2004

(54) METHOD AND APPARATUS FOR REDUCTION OF ENERGY LOSS DUE TO BODY DIODE CONDUCTION IN SYNCHRONOUS RECTIFIERS

(75) Inventors: Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/269,952

(22) Filed: Oct. 15, 2002

(65) Prior Publication Data

US 2003/0174522 A1 Sep. 18, 2003

Related U.S. Application Data

(60) Provisional application No. 60/363,541, filed on Mar. 13, 2002, and provisional application No. 60/406,299, filed on Aug. 28, 2002.

(51) Int. Cl.[7] ............................................. H02M 3/335
(52) U.S. Cl. ..................... 363/21.06; 21/21.14; 21/18
(58) Field of Search ................................ 363/20, 21.14, 363/21.06, 21.12, 18

(56) References Cited

U.S. PATENT DOCUMENTS

| | | | | |
|---|---|---|---|---|
| 5,303,138 A | * | 4/1994 | Rozman | 363/21.06 |
| 5,963,436 A | * | 10/1999 | Yoshida | 363/17 |
| 6,191,964 B1 | * | 2/2001 | Boylan et al. | 363/89 |
| 6,377,477 B1 | * | 4/2002 | Xie et al. | 363/21.14 |
| 6,418,039 B2 | * | 7/2002 | Lentini et al. | 363/21.06 |
| 6,452,818 B1 | * | 9/2002 | Simopoulos | 363/21.06 |
| 6,473,317 B1 | * | 10/2002 | Simopoulos | 363/21.06 |
| 6,504,735 B2 | * | 1/2003 | Negru et al. | 363/25 |
| 6,535,400 B2 | * | 3/2003 | Bridge | 363/21.06 |
| 6,574,124 B2 | * | 6/2003 | Lin et al. | 363/65 |
| 6,594,159 B2 | * | 7/2003 | Schlecht | 363/16 |
| 6,611,444 B2 | * | 8/2003 | Ayyanar et al. | 363/132 |
| 6,674,658 B2 | * | 1/2004 | Mao et al. | 363/127 |

* cited by examiner

*Primary Examiner*—Bao Q. Vu
(74) *Attorney, Agent, or Firm*—Whitham, Curtis & Christofferson, PC

(57) ABSTRACT

A method and apparatus for preventing current flow through the integral body diode of an electronic switch (e.g. MOSFET) in the secondary circuit of a synchronous rectifier. In a conventional synchronous rectifier, body diode current 31a 31b occurs during dead times 32a 32b. In the present invention, current steering pulses 40 are applied to the secondary circuit to oppose freewheeling current flow through the integral body diode. The current steering pulses produce a current that maintains the body diode in a reverse-biased state. Also, body diode current 31a 31b is prevented in the invention by short-circuiting a primary winding 19 of a transformer. The present invention prevents body diode conduction energy losses, as well as reverse recovery losses. The present invention is applicable to many different kinds of synchronous rectifiers such as current doubling rectifiers, center-tapped rectifiers, full bridge rectifiers.

27 Claims, 15 Drawing Sheets

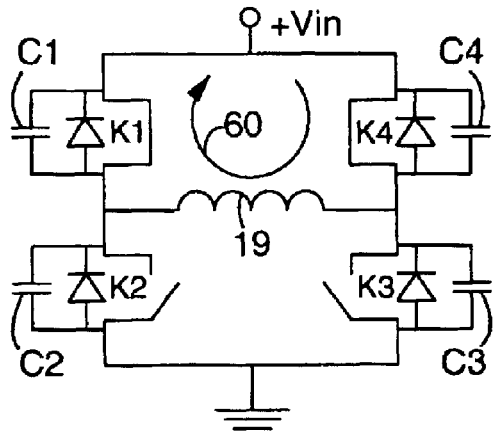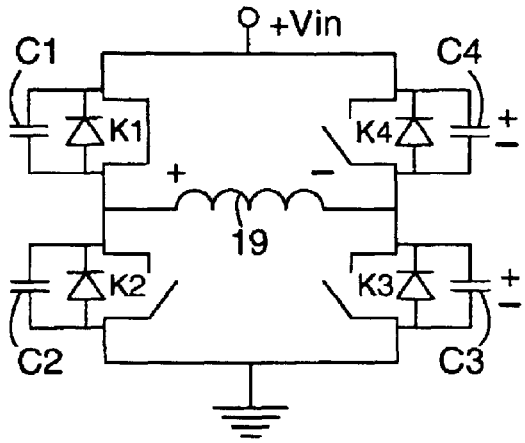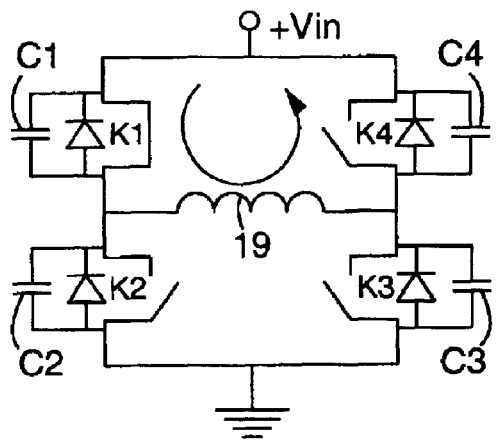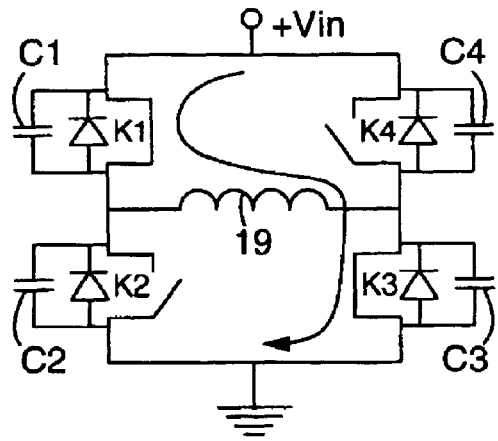
Fig.12a  Fig.12b  Fig.12c  Fig.12d
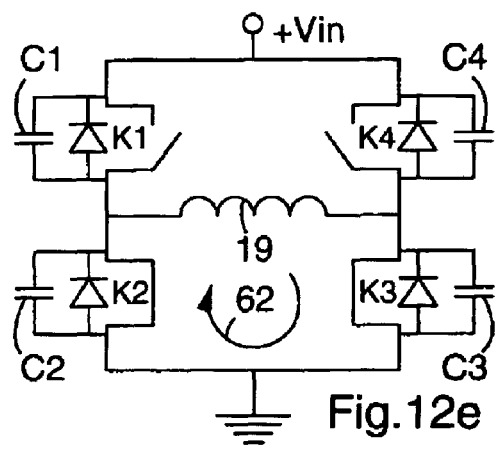
Fig.12e

METHOD AND APPARATUS FOR REDUCTION OF ENERGY LOSS DUE TO BODY DIODE CONDUCTION IN SYNCHRONOUS RECTIFIERS

RELATED APPLICATIONS

The present application claims the benefit of priority from co-pending provisional patent applications No. 60/363,541 filed on Mar. 13, 2002 and 60/406,299 on Aug. 28, 2002 which is hereby incorporated by reference.

FIELD OF THE INVENTION

The present invention relates generally to synchronous rectifiers and DC—DC converters. More particularly, it relates to a method and circuit for reducing or eliminating body diode current and the resultant energy losses in synchronous rectifiers having electronic switches (e.g. MOSFETs) with integral body diodes.

BACKGROUND OF THE INVENTION

Synchronous rectifiers (including synchronous DC—DC converters) are widely used in computing and telecommunications. They often provide low voltage, high current power required to operate microprocessors and other high speed electronics. Synchronous rectifiers employ several electronic switches (typically low on-resistance MOSFETs) to control current flow through a transformer and rectifying circuit. MOSFETs have an integral body diode that can conduct when the transistor is turned off. In a synchronous rectifier, the body-diodes of the rectifier MOSFETs will each conduct for a short portion of each switching cycle. Body-diode conduction in the MOSFET is a source of substantial energy loss and inefficiency because the diode has a rather large forward voltage drop (typically about 1.0 volts), and because of reverse recovery of the diode which occurs when the body diode conduction ceases. In low voltage applications (e.g. 1.2 volt output power supplies) the forward voltage drop across a body diode can produce exceptionally large energy loss.

In order to provide synchronous rectifiers with small size and weight, low cost, and rapid load variation capability (an important consideration for powering microprocessors), it is best to operate synchronous rectifiers at high frequency. However, body diode conduction losses and associated reverse recovery losses increase dramatically with increasing frequency, resulting in low conversion efficiency. Therefore, in order to increase the operating frequency of synchronous rectifiers, techniques must be found to decrease or eliminate body diode conduction.

Body diode conduction losses can be reduced by shortening the dead time between switching cycles. However, this increases the performance requirements of the gate driver circuit, and does nothing to ameliorate reverse recovery losses. Also, reducing the dead time cannot eliminate body diode conduction, since a nonzero dead time is essential when operating a synchronous rectifier.

It would be an advance in the art of synchronous rectifier design to provide a synchronous rectifier with reduced or eliminated body diode conduction losses and no reverse recovery losses. It would be particularly useful to provide a method of reducing or eliminating body diode conduction in synchronous rectifiers applicable to many different kinds of synchronous rectifiers, such as current-doubler synchronous rectifiers, center-tapped synchronous rectifiers and full-wave synchronous rectifiers.

SUMMARY

The present invention includes method for reducing body diode conduction in a synchronous rectifier. The synchronous rectifier has a secondary circuit with a rectifier switch with an integral body diode. The method includes the step of producing a steering current in the secondary circuit before a first dead time. The steering current opposes flow of freewheeling current through the integral body diode during the first dead time. In this way, the present invention can reduce or prevent entirely the body diode conduction during the first dead time. The steering current can be produced before or during the first dead time.

A turn-off pulse can be applied to the secondary after a power pulse.

The synchronous rectifier will typically have a transformer with a primary winding and a secondary winding; the secondary winding will be connected to the secondary circuit. A body diode current during a second dead time can be reduced or eliminated by short-circuiting the primary winding. The present invention is applicable to many kinds of synchronous rectifiers, including center-tapped synchronous rectifiers, current doubling synchronous rectifiers, and full bridge synchronous rectifiers.

The present invention also includes a method for reducing or eliminating body diode conduction in a synchronous rectifier during a second dead time. The synchronous rectifier has a transformer with a primary winding and a secondary winding. The method includes the step of short circuiting the primary winding during a second dead time. Short-circuiting the primary winding prevents the body diode conduction during the second dead time, and can be performed in combination with the steering current, or can be performed separately.

The present invention also includes a synchronous rectifier comprising a secondary circuit with a rectifier switch, an output inductor connected to the rectifier switch, and a circuit for producing a steering current in the secondary current. The steering current opposes freewheeling current from the output inductor during a first dead time, thereby preventing body diode conduction. The synchronous rectifier can also have a circuit for short-circuiting the transformer primary winding. The circuit for producing the steering current can be a multi-resonant primary circuit, a full bridge primary circuit, or a pulse generator coupled to the secondary circuit. The secondary circuit can be a center-tapped synchronous rectifier, current doubling synchronous rectifier, and full bridge synchronous rectifier.

The present invention also includes a synchronous rectifier with a transformer with a primary winding and a secondary winding, a primary circuit connected to the primary winding, a secondary circuit connected to the secondary winding, the secondary circuit having a rectifier switch with an integral body diode and an output inductor connected to the switch. The synchronous rectifier also has a circuit for producing steering current in the secondary circuit during a first dead time. The steering current opposes flow of freewheeling current from the output inductor during the first dead time.

The present invention also includes a synchronous rectifier full bridge primary circuit having four switches connected in a full bridge topology. The transformer primary is connected across the full bridge. The full bridge topology can provide the steering current and primary winding short circuit for preventing body diode current during both first and second dead times. The secondary circuit coupled to the primary full bridge circuit can be a center-tapped synchronous rectifier, current doubling synchronous rectifier, or full bridge synchronous rectifier, for example.

DESCRIPTION OF THE FIGURES

FIGS. 12a–12e illustrate circuit conditions in the primary circuit of FIG. 10 in portions of the timing diagram.

DETAILED DESCRIPTION OF THE PREFERRED EMBODIMENTS

The present invention provides a method and several circuits for reducing or eliminating body diode conduction in synchronous rectifier circuits. The present invention also eliminates associated reverse recovery losses of body diodes in synchronous rectifiers. It has been discovered that there are two body diode conduction pulses in synchronous rectifiers, and each body diode conduction pulse is created by a distinct mechanism. In the present invention, the first body diode conduction pulse is reduced by a current steering pulse applied to the rectifier in advance of the main power pulse. The steering current produced by the pulse opposes freewheeling current created by inductance that would otherwise create body diode current in the switch. In the present invention, the second body diode conduction pulse is reduced by short-circuiting the transformer primary. Short-circuiting the transformer maintains the steering current and thereby prevents the second body diode conduction pulse. The present invention includes several novel circuit designs for generating the current steering pulses, and for short circuiting the transformer.

Figure 1:
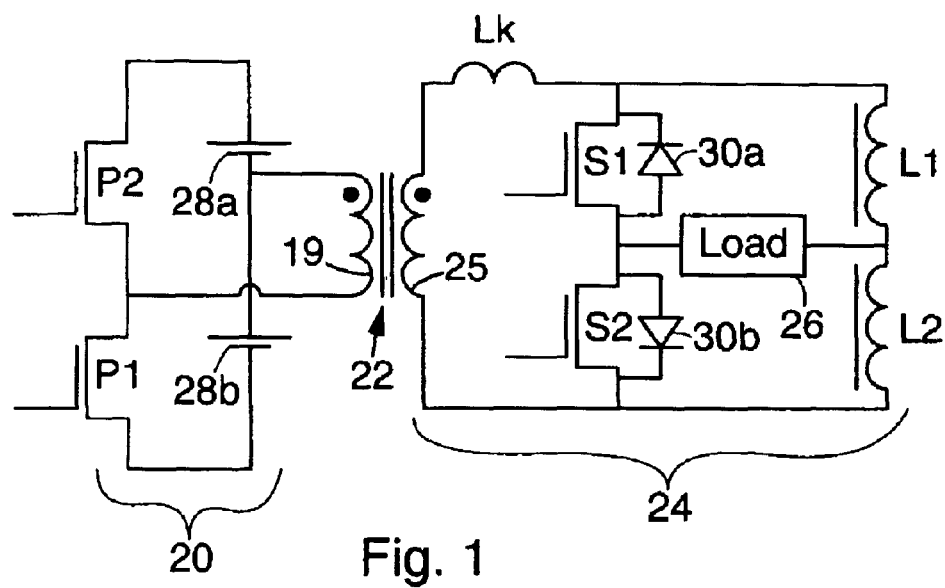
FIG. 1 shows a conventional synchronous rectifier.

FIG. 1 shows a conventional current doubling synchronous rectifier. The synchronous rectifier has a primary circuit 20, a transformer 22, and a secondary circuit 24. The transformer has a primary winding 19, a secondary winding 25 and a leakage inductance Lk. The primary circuit has two power sources 28a 28b and two electronic switches P1 P2, for example MOSFETs. The secondary circuit has two electronic switches S1 S2, for example MOSFETs and a load 26. The secondary circuit 24 has output inductors L1 L2 for filtering electrical power applied to the load 26. Additional filtering may be provided by a capacitor (not shown) in parallel with the load 26. Secondary switches S1 S2 each have integral body diodes 30a 30b. Primary switches P1 and P2 may also have integral body diodes, but these are immaterial in the present invention and hence are not illustrated.

Figure 2:
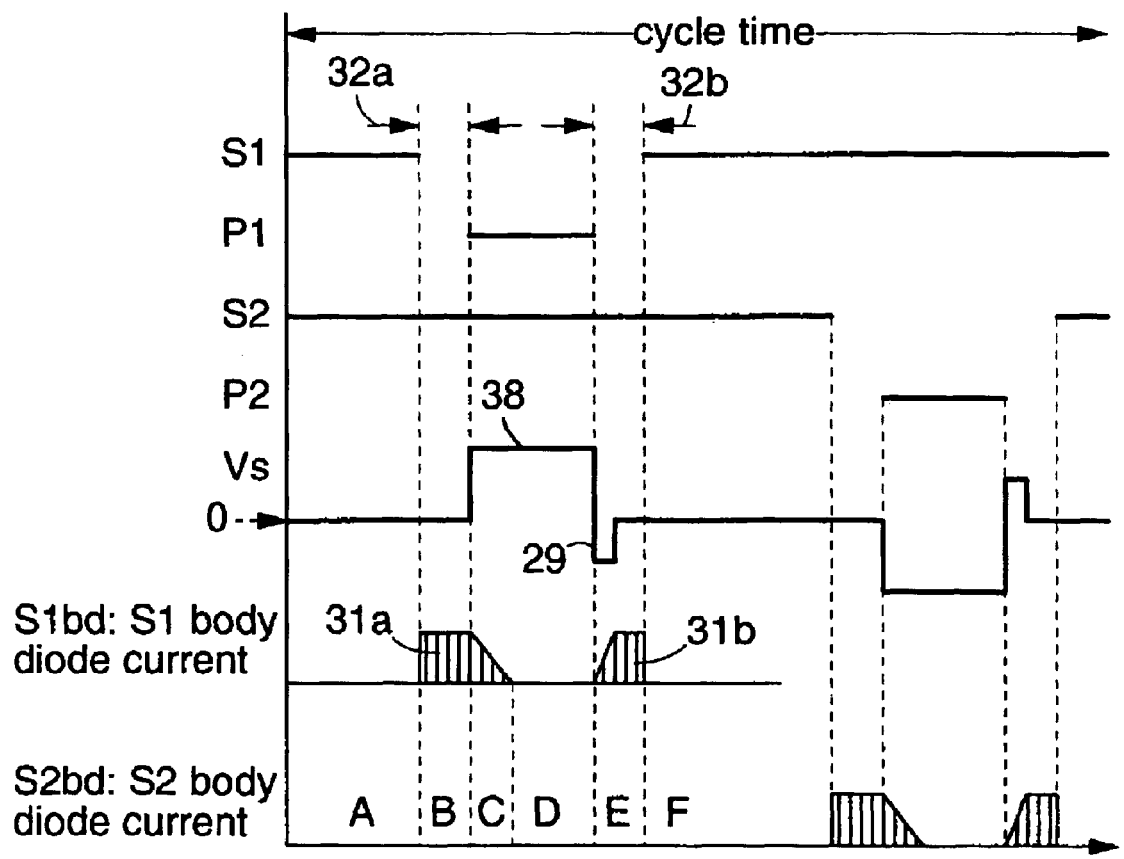
FIG. 2 shows a timing diagram for a conventional synchronous rectifier.

In operation, S1, S2, P1, and P2 are switched according to a pattern established by a gate driver circuit (not shown), as is known in the art. FIG. 2 illustrates a timing diagram for one complete switching cycle, and also shows S1 body diode current (S1bd) and S2 body diode current (S2bd), and voltage Vs across the secondary winding 25. Solid horizontal lines indicate the periods when switches S1 S2 P1 P2 are in the ON (conducting) state. The complete cycle time can be 0.5–20 microseconds, for example. Power pulse 38 is produced by P1, and provides power to the secondary circuit 25 and load 26.

It is noted that S2 and P2 operate in a manner exactly parallel to S1 and P1. Therefore, only S1 and P1 will be discussed, with the understanding that statements regarding S1 and P1 are equally applicable to S2 and P2.

S1 body diode 30a experiences a first body diode current pulse 31a when S1 is turned off (i.e. at the start of a first dead time 32a). The first body diode current pulse 31a is caused by freewheeling current from L1 being shunted through the S1 body diode 30a. S1 experiences a second body diode current pulse 31b when P1 is turned off (i.e. at the start of a second dead time 32b). The second body diode current pulse 31b is caused by resonance between parasitic capacitance of P1 and the transformer leakage inductance Lk. Specifically, the parasitic capacitance of P1 and the leakage inductance Lk create a voltage overshoot 29 responsible for generating the second body diode current pulse 31b.

S1 and P1 cannot be on at the same time. Therefore, first and second dead times 32a 32b are established between the changes of state for S1 and P1 to assure that they are never on at the same time. Body diode current occurs during the dead times 32a 32b. The dead times are typically made as short as possible so that body diode current flows for a short duration, and the resultant energy losses are minimized. However, the dead times 32a 32b must have a nonzero duration, and any body diode current at all will result in reverse recovery loss in the body diode. The first dead time 32a is defined in the present specification as occurring immediately before the power pulse 38; the second dead time 32b is defined in the present specification as occurring immediately after the power pulse 38.

Time periods A, B, C, D, E, and F shown in FIG. 2 correspond to distinct conditions in the secondary circuit of FIG. 1 (time periods are divided by vertical dotted lines). FIGS. 3a, 3b, 3c, 3d, 3e, and 3f each illustrate the conditions in the secondary circuit during the time periods A–F (for brevity, the primary circuit is not shown in FIGS. 3a–3f). Taken together, FIGS. 3a–3f illustrate how first and second body diode current pulses 31a 31b arise in the conventional synchronous rectifier of FIG. 1. It is emphasized that the first body diode current pulse 31a and second body diode current pulse 31b have different origins (and hence somewhat different control mechanisms in the present invention). Following are explanations of FIGS. 3a–3f.

Figure 3A:
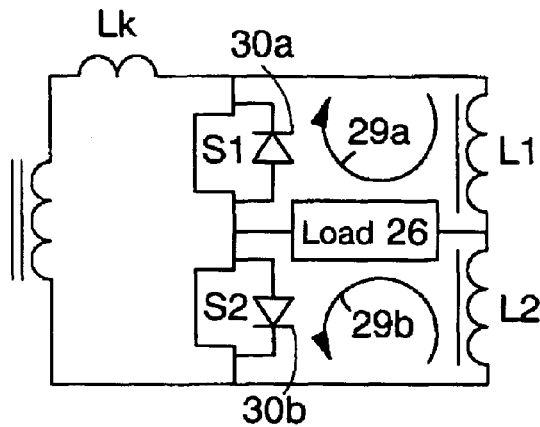
FIGS. 3a–3f show circuit diagrams illustrating current flow during operation of a conventional synchronous rectifier.

FIG. 3a: Time period A. P1 and P2 are off; S1 and S2 are on. Employing energy stored from a previous cycle, inductors L1 and L2 provide freewheeling currents 29a 29b through S1 and S2 and through the load 26. The load 26 is powered by the output inductors L1 L2 during time period A.

Figure 3B:
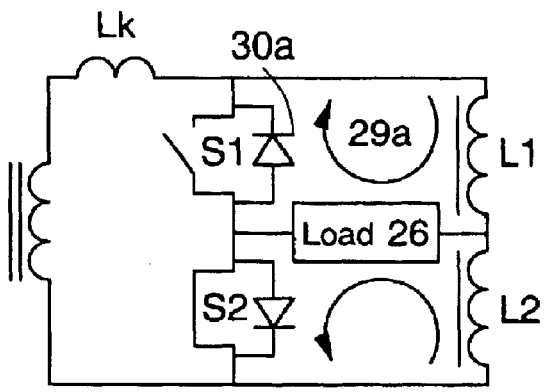

FIG. 3b: Time period B. At start of dead time 32a, S1 is switched off. Inductor L1 is providing freewheeling current 29a which is shunted through the S1 body diode 30a, resulting in the first body diode current pulse 31a. The S1 body diode current pulse 31a increases sharply as S1 is turned off.

Figure 3C:
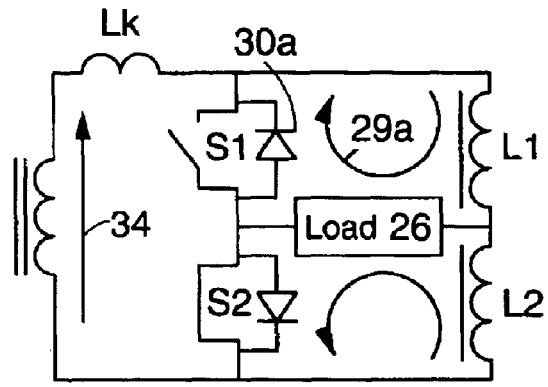

FIG. 3c: Time period C, also known as the commutation time (time for secondary winding current to ramp up to maximum). P1 (not shown) is switched on, and secondary current 34 increases with time. The secondary current 34 tends to oppose the voltage drop across the body diode 30a, thereby decreasing S1 body diode current. The secondary current 34 during time period C provides power for charging the transformer leakage inductance Lk.

Figure 3D:
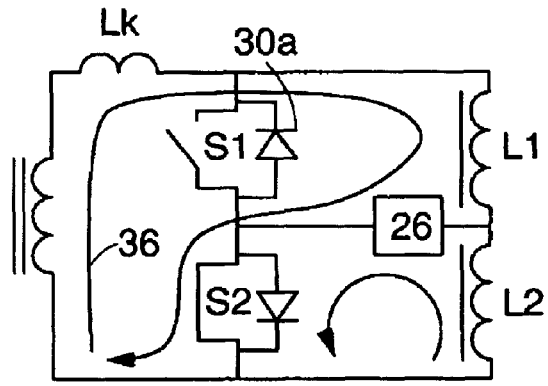

FIG. 3d: Time period D. The secondary current 34 is at full amplitude, and the current through body diode 30a is reduced to zero. The body diode 30a may even be reverse-biased during time period D. The secondary current 34 during time period D provides power for charging the output inductor L1, and for driving the load 26. The secondary current 34, and the freewheeling current 29a from L1 are shown as a single current 36 which does not flow through S1.

Figure 3E:
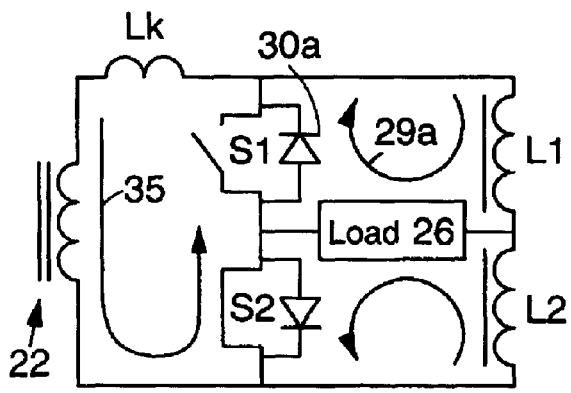

FIG. 3e. Time period E. P1 is switched off, and secondary current 34 decreases. The transformer leakage inductance Lk and transformer 22, in resonance with parasitic capacitance of P1 (not shown) create overshoot voltage pulse 29 when P1 is switched off. The overshoot 29 creates overshoot current 35 flowing through S2 and the S1 body diode. In other words, overshoot current 35 cancels the secondary winding current 36, thereby shunting current through the S1 body diode 30a. This mechanism produces the second body diode current pulse 31b during the second dead time 32b.

Figure 3F:
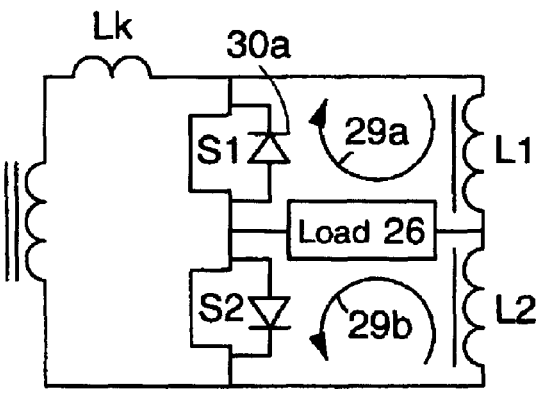

FIG. 3f: Time period F. S1 is switched on, and the circuit returns to the conditions present in time period A.

Specifically, S1 shunts the overshoot current 35 from the body diode 30a. Freewheeling currents 29a 29b from L1 and L2 flow through S1 and S2 and provide power to the load 26.

Switches S2 and P2 operate in the same manner as S1 and P1, respectively, and a complete switching cycle includes an analogous switching scheme for switches S2 and P2. For brevity, the operation of switches P2 and S2 is omitted.

It is noted from the foregoing description that the first body diode current pulse 31a is caused by freewheeling current from inductor L1 flowing through the switch S1. Second body diode current pulse 31b is caused by energy stored in the transformer leakage inductance Lk charging the parasitic capacitance of switch P1.

In the present invention, first body diode current pulse 31a is prevented by a small current-steering pulse that oppose the L1 freewheeling current during the dead time 32a. The current-steering pulse opposes the freewheeling current across the switch S1. The current steering pulse must have the same polarity as the power pulse that follows it.

In the present invention, second body diode current pulse 31b is prevented by short-circuiting the transformer primary 19. This effectively prevents the overshoot voltage pulse 29, and, hence, the second body diode current pulse 31b. In an alternative characterization of the present invention, short-circuiting the transformer primary 19 maintains the steering current during the second dead time 32b, thereby preventing the second body diode current pulse 31b.

Figure 4:
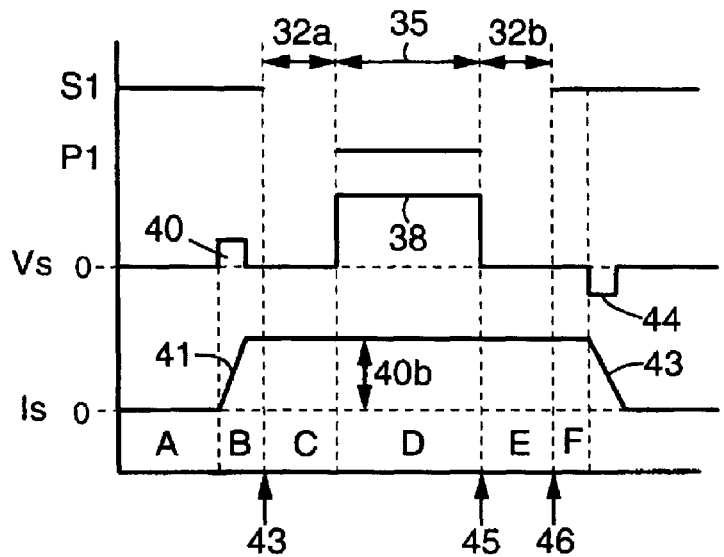
FIG. 4 shows a switching diagram with current steering pulse and short-circuiting of a primary winding according to the present invention.

FIG. 4 shows a timing diagram illustrating a first aspect of the present invention for preventing the first body diode current pulse 31a. The timing diagram of FIG. 4 shows only ½ a switching cycle (the portion of the cycle dedicated to S1 and P1); the other half of the switching cycle dedicated to operation of P2 and S2 is analogous. Vs is the voltage across the secondary winding 25 of the transformer, and Is is the current through the secondary winding 25. Dead times 32a 32b are established so that S1 and P1 are never on at the same time. When P1 is on, a large power pulse 38 is created at the transformer secondary 25. This power pulse charges the inductor L1, and applies power to the load 26. The timing diagram of FIG. 4 can be used in combination with the current doubling synchronous rectifier secondary circuit 24 of FIG. 1, for example, as well as other secondary circuits such as full bridge and center tapped synchronous rectifier secondary circuits.

In the present invention, a current steering pulse 40 creates a ramp-up 41 of Is, since S1 and S2 are both on and provide a low-resistance current path for current from the transformer secondary. The elevated Is created by the current steering pulse 40 prevents the first body diode current pulse 31a. Secondary current Is is relatively unaffected by the power pulse 38 since S1 is off during the power pulse 38, and current from the power pulse 38 must pass through L1.

Figure 5A:
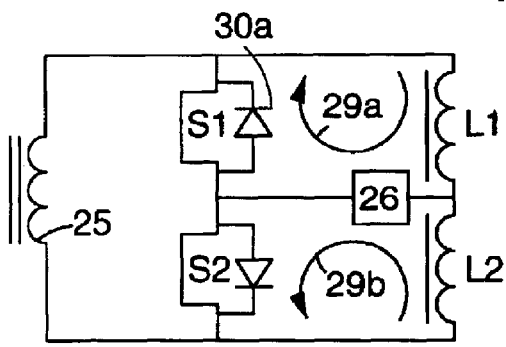
FIGS. 5a–5f illustrate how the current steering pulses of the present invention prevent first and second body diode current pulses.
Figure 5B:
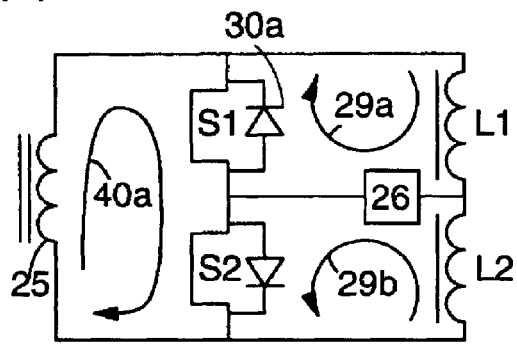
Figure 5C:
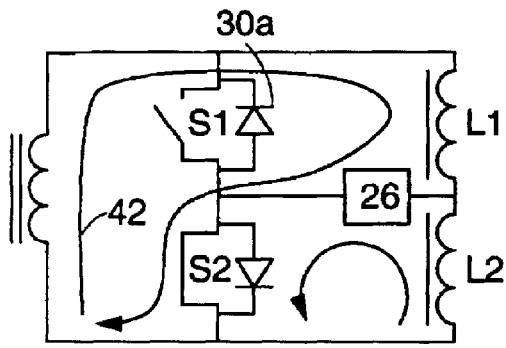

To more fully illustrate the effect of current-steering pulse 40, time periods A, B, and C are designated (each time period is divided by dotted lines), and FIGS. 5a, 5b, and 5c illustrate the secondary circuit conditions during these time periods.

FIG. 5a: Time period A. S1 and S2 are both on, and freewheeling current 29a 29b is flowing through the load 26 from inductors L1 and L2.

FIG. 5b: Time period B. S1 and S2 are both on, and freewheeling current is flowing through the load 26 from inductors L1 and L2. Current steering pulse 40 produces steering current 40a in the secondary winding 25. The steering current magnitude 40b is represented in FIG. 4. The steering current 40a opposes the flow of freewheeling current from L1 across S1

FIG. 5c: Time period C. S1 is off (non-conducting). The L1 freewheeling current 29a, and the steering current 40b are shown as a combined current 42. The combined current 42 does not pass through the S1 body diode 30a. This is because the L1 freewheeling current 29a, and the steering current 40a are cancelled across the S1 body diode 30a. In this way, the steering current 40a prevents at least a portion of the L1 freewheeling current from flowing through the S1 body diode 30a. Hence, the current steering pulse 40 of the present invention prevents the first body diode current pulse.

Alternatively, the steering current 40a can be larger than the L1 freewheeling current 29a. In this case, the S1 body diode 30a will be reverse-biased.

It is noted that the current steering pulse 40 must have the same polarity as the power pulse 38 which follows it.

The current steering pulse 40 can be produced by any method according to the present invention. For example, special circuits dedicated to producing the current steering pulse 40 can be coupled to the secondary circuit, or preferably the current steering pulse can be generated in the primary circuit. Several specific methods for producing the current steering pulses 40 are described later in this specification.

In the present invention, the second body diode current pulse 31b is prevented by eliminating the overshoot voltage pulse 29. Specifically, the overshoot 29 is eliminated by short-circuiting the transformer primary winding 19 concurrent with or slightly after the P1 turnoff time 45. Preferably, the primary winding 19 is short-circuited for the duration of the second dead time 32b.

Figure 6:
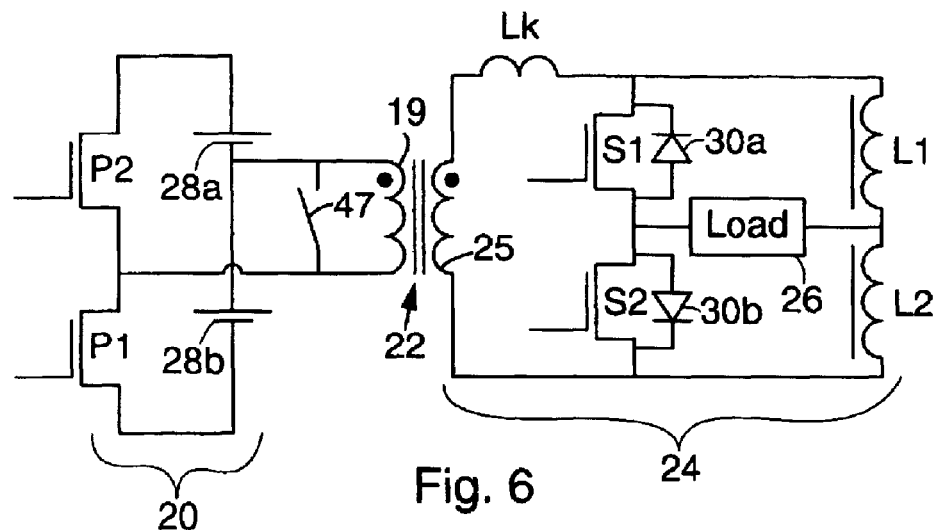
FIG. 6 shows a synchronous rectifier according to the present invention having a short circuit switch across the primary winding.

FIG. 6 shows a current doubling rectifier according to the present invention having a short circuit switch 47 connected in parallel with the primary winding 19 for short-circuiting the primary winding. The switch can be any kind of high-speed, low on-resistance electronic switch, such as two back-to-back MOSFET switches in series. Specifically, short circuit switch 47 prevents overshoot 29 by preventing LC-type oscillation between the parasitic capacitance of P1 and the transformer leakage inductance Lk. The short circuit switch 47 should have a low on-resistance of less than about 0.10 hms or 0.02 Ohms, for example. If the leakage inductance Lk is large, then a larger resistance for the short circuit can be acceptable. Several other circuits capable of short-circuiting the transformer primary are contemplated in the invention, and are described below in the present specification.

Figure 5D:
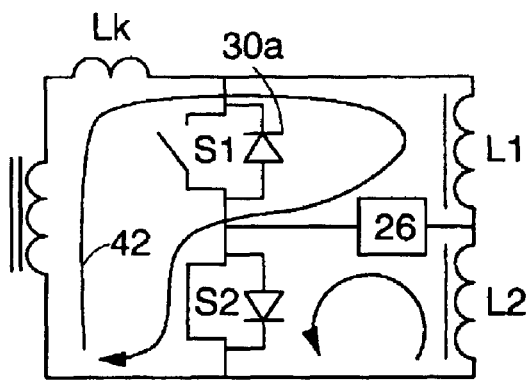
Figure 5E:
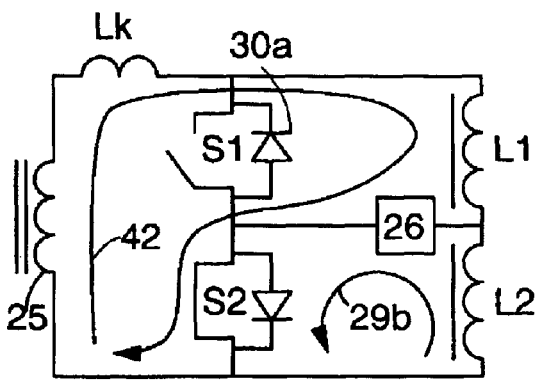
Figure 5F:
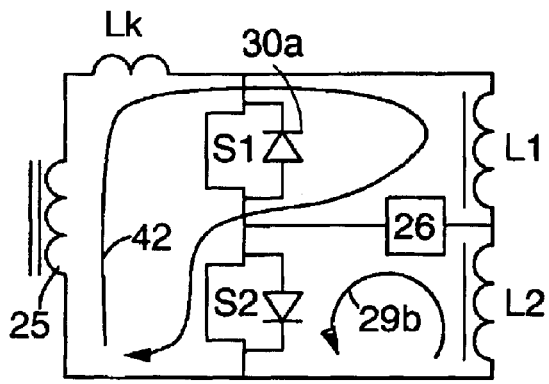

To illustrate the effect of the short circuit switch 47, time periods D, E, and F are designated in FIG. 4. FIGS. 5d, 5e, and 5f illustrate the secondary circuit conditions during these time periods.

FIG. 5d: Time period D: Combined current 42 comprises current produced by the current steering pulse 40, and freewheeling current from L1. Current through secondary winding is equal to current flowing through output inductor L1. During time period D, the inductor L1 is charged by the power pulse 38.

FIG. 5e: Time period E: At the onset of time period E, P1 is turned off, short circuit switch 47 is turned on, and Vs falls. Short circuit switch prevents Vs from going negative. Secondary winding current Is remains constant during the dead time 32b, so the combined current 42 remains relatively unchanged. This effectively prevents body diode conduction in S1.

FIG. 5f: Time period F. S1 is turned on, but with Is still elevated, little or no current flows through S1.

It is noted that the second body diode current pulse 31b (but not the first body diode current pulse 31a) can be prevented in the present invention even if the current steering pulse 40 is not applied. In the case where the current steering pulse 40 is not applied, the power pulse 38 tends to increase secondary current Is. If the primary winding 19 is then short-circuited during the second dead time, the increased Is provided by the power pulse will be sufficient to prevent the second body diode current pulse 31b. Hence, the first and second body diode current pulses can be separately controlled, if desired. According to the invention, either first or second body diode current pulse, or, preferably, both body diode current pulses, can be prevented.

Referring back to FIG. 4, in a preferred embodiment of the invention, a turn off pulse 44 is applied to the secondary circuit shortly after the S1 turn on time 46. The turn off pulse causes a ramp-down 43 of the secondary current Is, as shown in FIG. 4. The ramp-down of Is allows freewheeling current from L1 to flow through S1, which is now on. Also, ramp-down 43 of Is tends to reduce conduction losses in the secondary winding, thereby improving energy efficiency. In a particularly preferred embodiment, turn off pulse 44 is designed (i.e. matched with the current steering pulse 40) so that Is is reduced to zero, as shown in FIG. 4.

To further minimize energy losses, the current steering pulse 40 should occur very close to (very shortly before) the S1 turn-off time 43. Also, the turn-off pulse 44 should occur very close to (very shortly after) the S1 turn-on time 46. This will tend to minimize the duration of the steering current 40a (illustrated in FIG. 5b), maximize the duration of zero secondary current Is, and hence will minimize conduction losses.

Figure 7A:
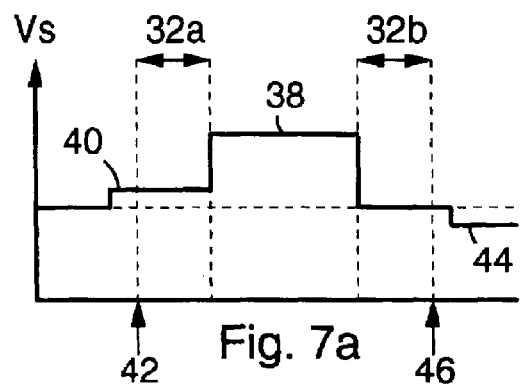
FIGS. 7a–7f show several different possible waveform shapes for the current steering pulses.
Figure 7B:
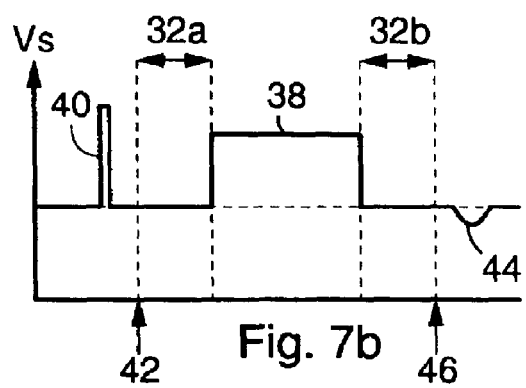
Figure 7C:
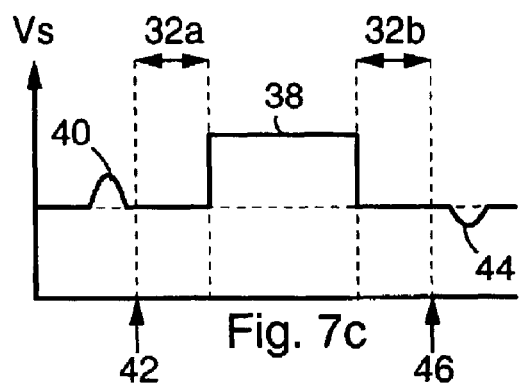
Figure 7D:
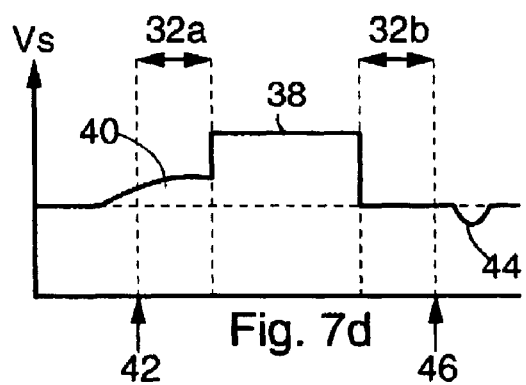
Figure 7E:
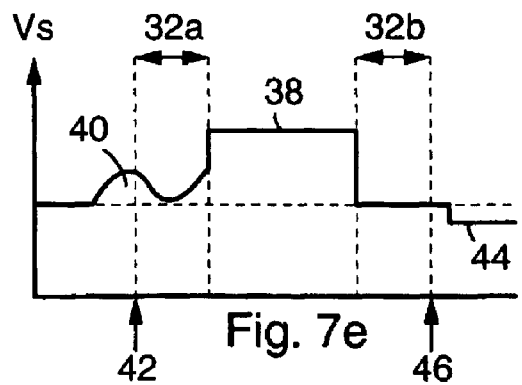
Figure 7F:
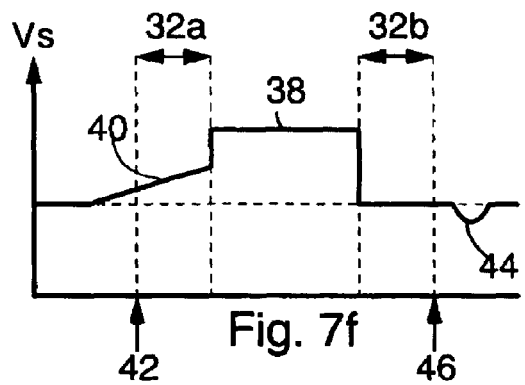

The current steering pulse 40 and turn-off pulse 44 do not need to have a square waveform as shown in FIG. 4. In fact, the pulses 40 44 can have many different shapes, and can have the same or different shapes. FIGS. 7a–7f show power pulses in combination with exemplary current steering pulses 40 and current steering turn-off pulses 44 that can be employed in the present invention. The current steering pulse 40 can have a greater peak voltage than the power pulse 38, as shown in FIG. 7b. Also, the current steering pulse can occur during the dead time 32a, as shown in FIGS. 7a, 7d, 7e, and 6f. However, in the present invention the current steering pulse should start before the dead time 32a, as shown in FIGS. 7a–7f. Starting the current steering pulse before the dead time 32a can completely prevent body diode conduction, which is necessary for preventing reverse recovery losses. If the current steering pulse starts after the S1 turn on time 42, body diode conduction can be reduced, but not eliminated, and reverse recovery losses will not be prevented.

It is also noted that the power pulse 38 does not necessarily have a square waveform. The power pulse can have many different shapes. However, the power pulse must be bracketed by dead times 32a 32b.

Figure 8:
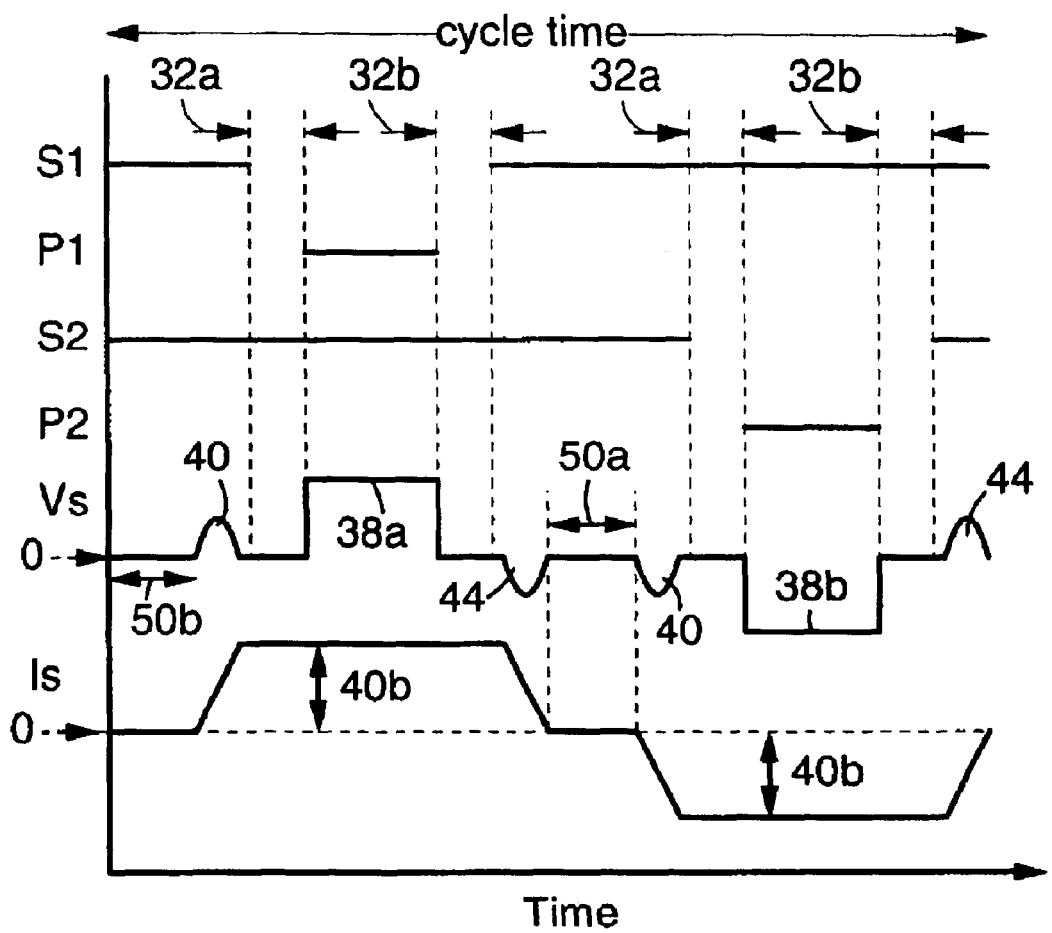
FIG. 8 shows a timing diagram of a full switching cycle according to the present invention.

FIG. 8 shows a diagram of a full switching cycle according to the present invention. Positive and negative power pulses 38a 38b are each preceded by current steering pulses 40 of the same polarity. Each power pulse 38a 38b is followed by a turn-off pulse 44 of the opposite polarity. The current steering pulses 40 produce ramp-ups of the secondary current Is to the steering current magnitude 40b that prevents body diode conduction. The turn-off pulses produce ramp-downs of the secondary current Is, preferably to zero. Preferably, the steering pulse 40 and turn-off pulse 44 are separated by periods 50a, 50b, during which the secondary current is zero, or nearly zero. Preferably, periods 50a 50b are as long as possible without the steering pulse 40 or turn-off pulse 44 being entirely within the dead times 32a 32b. Increasing the duration of periods 50a 50b tends to reduce conduction losses in the secondary winding of the transformer because secondary current Is is zero or nearly zero during the periods 50a 50b.

Figure 9A:
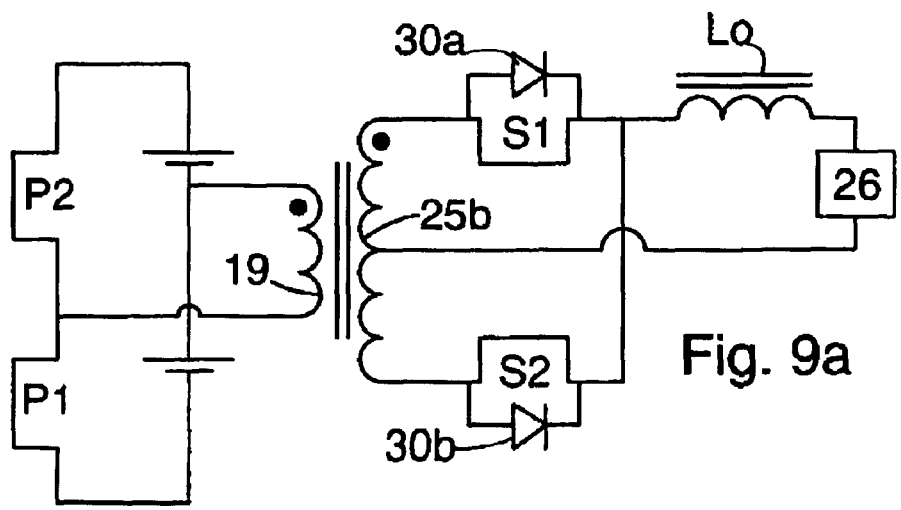
FIG. 9a shows a synchronous rectifier with a center-tapped secondary winding that can be operated according to the present invention.
Figure 9B:
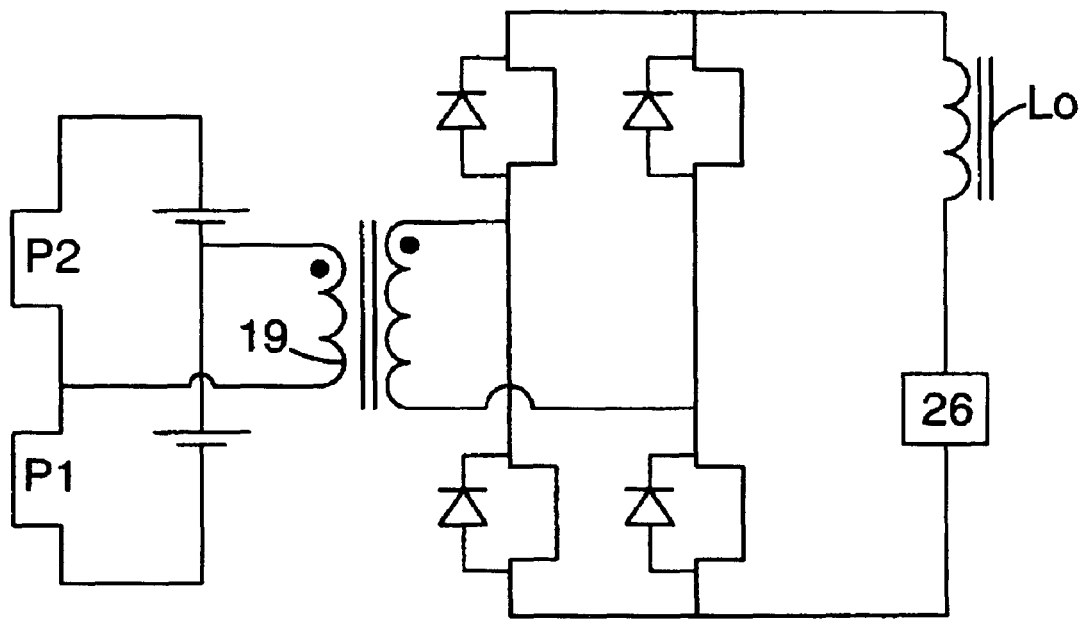
FIG. 9b shows a full bridge synchronous rectifier circuit that can be operated according to the present invention.

The present invention is applicable to many different kinds of secondary circuits, including full bridge synchronous rectifiers, current doubler synchronous rectifiers (i.e. the secondary circuits shown in FIGS. 1, 3, 5, and 6), and center-tapped synchronous rectifiers. FIG. 9a, for example, shows a center-tapped synchronous rectifier having a center-tapped secondary winding 25b. FIG. 9b shows a full bridge synchronous rectifier. The full bridge synchronous rectifier, current doubling synchronous rectifier, and center-tapped synchronous rectifier can all be operated according to the present invention to prevent first and second body diode current pulses and reverse recovery losses. A timing diagram for the rectifier of FIG. 9a is essentially the same as the timing diagram of FIG. 2 when operated conventionally with body diode current pulses.

The circuit of FIG. 9a has an output inductor Lo connected to both rectifier switches S1 S2. The load 26 is connected between the output inductor Lo and the secondary winding center tap. In operation, the circuit of FIG. 9a experiences body diode current pulses during the first and second dead times. The first body diode current pulse is created during the first dead time by freewheeling current from the output inductor Lo. The second body diode current pulse is created during the second dead time by transformer leakage inductance Lk and resonance effects of the parasitic capacitance of switches P1 and P2. The first and second body diode current pulses in the device of FIG. 9a can be effectively prevented by the method of the present invention. Specifically, a steering current applied before the first dead time will prevent the first body diode current pulse, and short-circuiting the transformer primary winding 19 will prevent the second body diode current pulse. The method for preventing body diode current pulses in the secondary circuit of FIG. 9a is the same as the method for preventing body diode current pulses in the current doubling secondary circuit of FIGS. 1, 3, 5, and 6.

Figure 10:
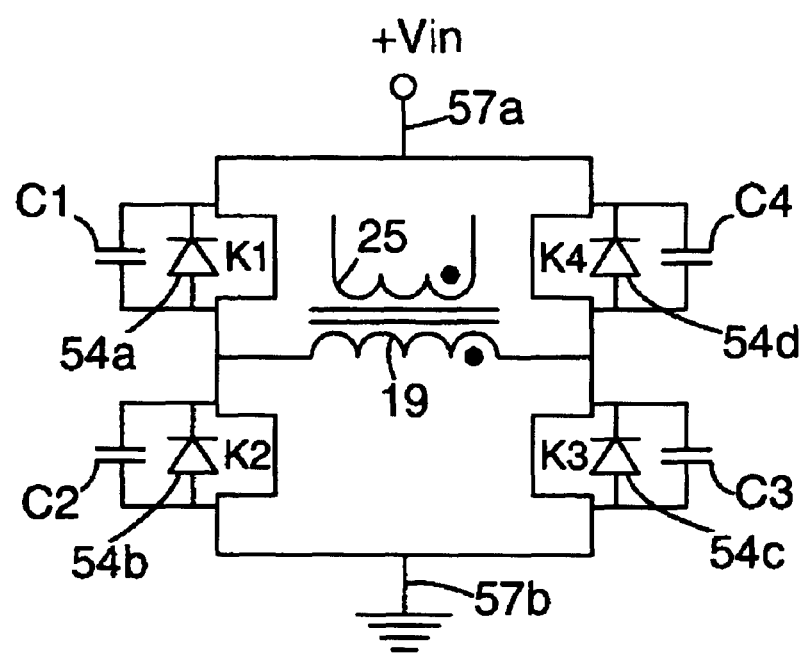
FIG. 10 shows a full bridge primary circuit according to the present invention for preventing body diode current pulses.

The present invention includes several novel circuits for generating the current steering pulses 40, and for short-circuiting the primary winding 19, as required in the present invention to prevent body diode current pulses. FIG. 10, for example, illustrates a full bridge primary circuit topology for carrying out the present invention. For brevity, only the primary circuit, primary winding 19, and secondary winding 25 are illustrated in FIG. 10. In operation, the secondary winding 25 would be connected to a synchronous rectifier secondary circuit (e.g. current doubling secondary circuit of FIGS. 1, 3, 5, and 6, or the center-tapped secondary circuit of FIG. 9a, or the full bridge secondary circuit of FIG. 9b).

In the primary circuit of FIG. 10, the primary winding 19 is connected to four electronic switches K1, K2, K3, K4 such as low on-resistance MOSFETs. Each switch has an integral body diode 54a 54b 54c 54d. Capacitors C1 C2 C3 C4 are connected in parallel with each switch K1 K2 K3 K4. Terminals 57a 57b receive DC electrical power. The switches K1 K2 K3 K4 are arranged with two groups of two switches (group K1+K2 and group K3+K4), with the switches of each group connected in series across the terminals 57a 57b. The two groups of switches are connected in parallel. The transformer primary 19 is connected between the two groups of switches. All the switches K1 K2 K3 K4 are controlled by a gate driver circuit (not shown) such that the voltage waveform at the secondary winding 25 has the current steering pulse 40 and the power pulse 38. The turn-off pulse 44 is not provided by the embodiment of FIG. 10. Also, the circuit of FIG. 10 short-circuits the primary winding 19 at appropriate times to prevent the second body diode current pulse.

Figure 11:
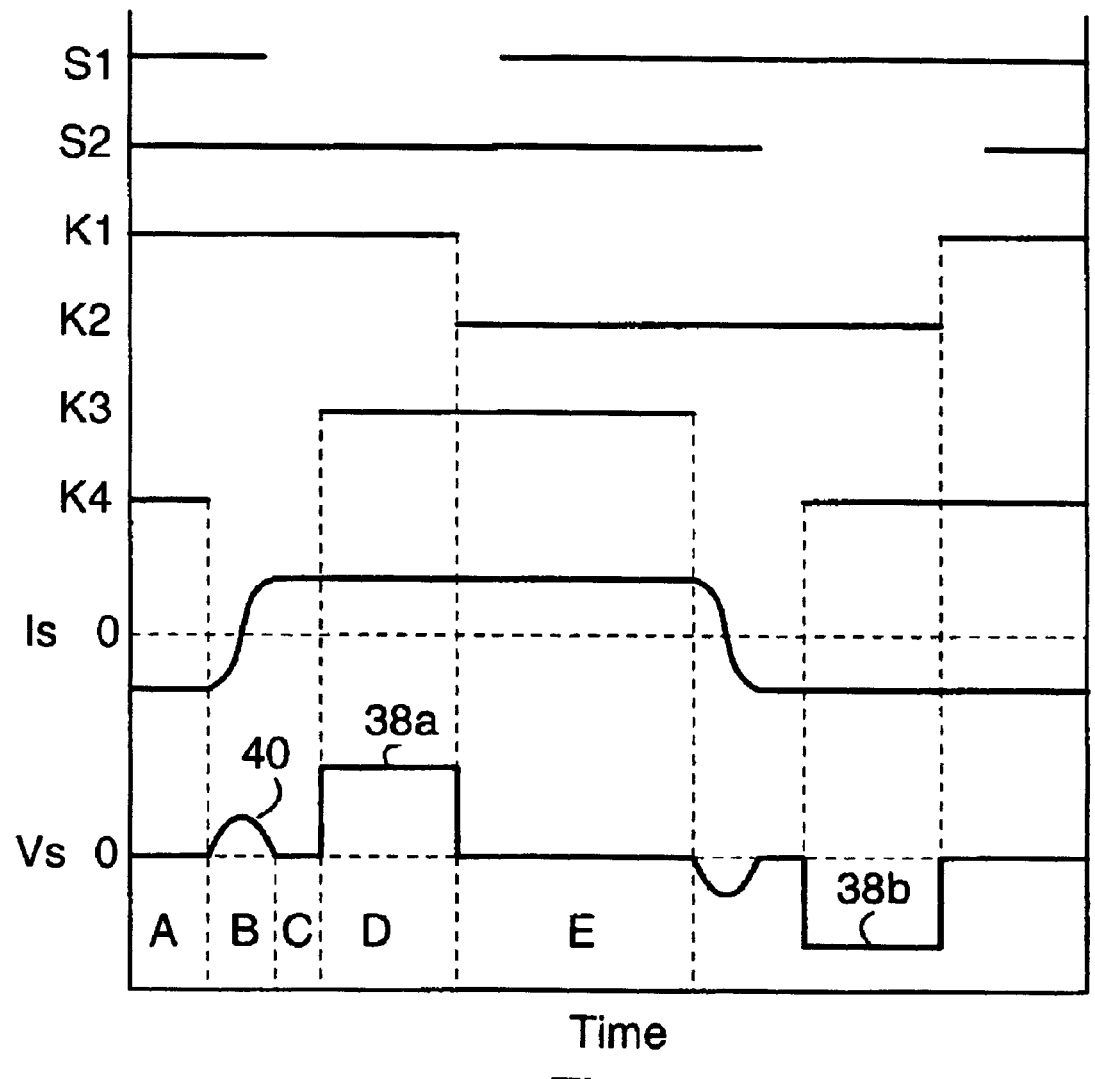
FIG. 11 shows a timing diagram for operating the circuit of FIG. 10.

FIG. 11 illustrates a full-cycle timing diagram for operating the circuit of FIG. 10 according to the present invention. FIG. 11 includes timing information for secondary switches S1 S2, in the specific case where the primary circuit of FIG. 10 is connected to the standard secondary circuit of FIGS. 1, 3, 5, and 6.

To illustrate the operation of the primary circuit of FIG. 10, time periods A, B, C, D, and E are designated. FIGS. 12a–12e illustrate the circuit conditions during each of these time periods.

FIG. 12a: Time period A. K1 and K4 are on, and K2 and K3 are off. The primary winding is short-circuited by K1 and K4, and hence Vs is zero. Freewheeling current 60 flows through K1, K4 and the primary 19.

FIG. 12b: Time period B. K4 is switched off, and C4 and C3 acquire a charge from the freewheeling current 60. Current steering pulse 40 is produced at the secondary winding (not shown) as C4 charges. The duration of the current steering pulse 40 (equivalent to the duration of the time period B) is determined by the value of C4, C3 and the leakage inductance of the transformer. Specifically, the duration of the current steering pulse will be approximately equal to ½ the LC resonance period of C4+C3 and the leakage inductance. The shape of the current steering pulse is sinusoidal since it is produced by LC resonance.

FIG. 12c: Time period C. Time period C is the first dead time. Resonance between C4 and leakage inductance is prevented from forcing Vs negative by the K4 body diode. The first body diode current pulse in the secondary is prevented by the current steering pulse 40, and the elevated Is (i.e. the steering current).

FIG. 12d: Tine period D: K3 is turned on and power flows through K1, the primary, and K3, producing power pulse 38a. Power is supplied to the secondary circuit (not shown).

FIG. 12e: Time period E:K2 and K3 are on, thereby short-circuiting the primary winding 19 and preventing the second body diode current pulse in the secondary circuit (not shown). Also, K2 and K3 turn off the power pulse 38a. Freewheeling current 62 flows through K2, K3 and the primary 19. Time period E is analogous to time period A for the second half of the switching cycle.

In this way, the full bridge circuit of FIG. 10 provides current steering pulses 40, and short-circuiting of the primary 19 at appropriate times so that both the first and second body diode current pulses (and associated reverse recovery losses) are prevented in the secondary circuit.

It is noted that capacitors C1 and C2 provide soft turnoff for K1 and K2. Capacitors C1 and C2 can be larger than capacitors C3 and C4, for example about 10 times larger.

The output voltage of a synchronous rectifier employing the primary circuit of FIG. 10 can be adjusted by varying the duration of the power pulses 38a 38b (i.e. duration of time period D). The duration of the power pulses 38a 38b can be adjusted by adjusting the phase of K3 and K4 with respect to K1 and K2. Preferably, the durations of both power pulses 38a 38b are equal. Hence, the circuit of FIG. 10 can produce a smoothly variable output voltage by adjusting the relative timing relationships between switches K2 and K3, and between K1 and K4.

Figure 13:
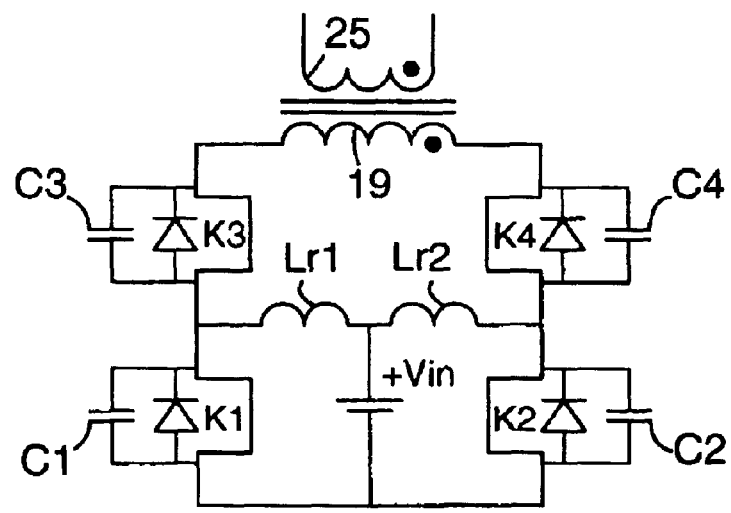
FIG. 13 shows a multi-resonant primary circuit according to the present invention for preventing body diode current pulses.

FIG. 13 shows a multi-resonant primary circuit according to the present invention. The multi-resonant primary circuit of FIG. 13 provides current steering pulses and short circuiting of the primary winding 19 so that first and second body diode current pulses are prevented. The multi-resonant primary circuit of FIG. 13 can be used with many different secondary circuits, such as the current doubling secondary circuit of FIGS. 1, 3, 5, and 6, or the center-tapped secondary circuit of FIG. 9a, or the full bridge secondary circuit of FIG. 9b. The multi-resonant primary circuit of FIG. 13 has four electronic switches K1–K4, and four capacitors C1–C4 connected as shown. Resonant inductors Lr1 Lr2 are connected between the switches and to the DC power source Vin. Lr1 and Lr2 preferably have the same inductance value.

Figure 14:
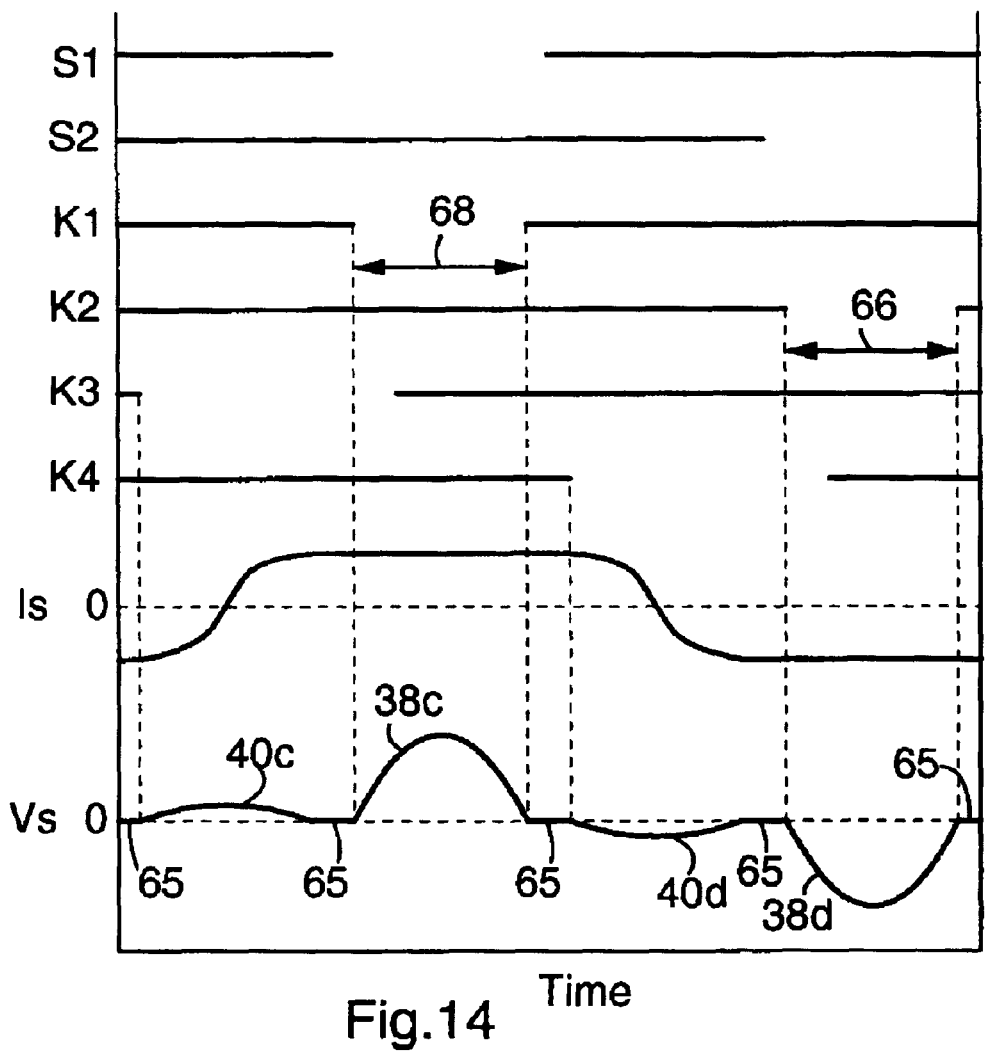
FIG. 14 shows a timing diagram for operating the circuits of FIG. 13, 15 or 16.

FIG. 14 shows a timing diagram for operating the primary circuit of FIG. 13. FIG. 14 includes timing information for S1 and S2 (e.g. for the standard secondary circuit of FIGS. 3, 5, and 6). In operation, the positive current steering pulse 40c is produced by LC resonance between C3 and the transformer leakage inductance. The negative current steering pulse 40d is produced by LC resonance between C4 and the transformer leakage inductance. Preferably, C3 and C4 have the same capacitance so that current steering pulses 40c 40d have the same power. The durations of the current steering pulses 40c 40d is approximately equal to ½ the LC resonance period of the transformer leakage inductance and the capacitors C3 and C4, respectively.

Positive power pulse 38c is produced by resonance between C1 and Lr1; negative power pulse 38d is produced by resonance between C2 and Lr2. Increasing the inductance of Lr1 or Lr2 will increase the duration of the respective power pulses. Increasing the capacitance of C1 or C2 will also increase the duration of the respective power pulses. Zero-voltage periods 65 are produced by the integral body diodes of K1, K2, K3 and K4, which prevent current reversal. Lr1 and Lr2 should have inductance greater than the leakage inductance Lk of the transformer. The power output of the circuit of FIG. 13 can be varied by varying the input voltage Vin.

Figure 15:
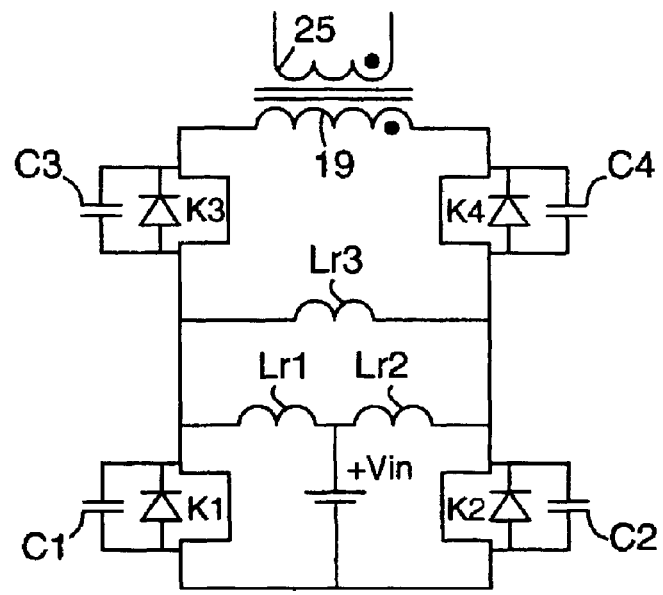
FIG. 15 shows a variation of a multi-resonant primary circuit according to the present invention for preventing body diode current pulses.

FIG. 15 shows a multi-resonant primary circuit that is a variation of the multi-resonant circuit of FIG. 13. Specifically, resonant inductor Lr3 has been added. Resonant inductor Lr3 is much smaller (e.g. about ten times smaller) than Lr1 and Lr2. Lr1 and Lr2 are large-value inductors and function as current sources. In operation, the primary circuit of FIG. 15 is operated according to the same timing diagram as the circuit of FIG. 13, which is shown in FIG. 14. Resonant inductor Lr3 provides a power boost to the power pulses 38c 38d by resonating with capacitors C1 and C2.

Figure 16:
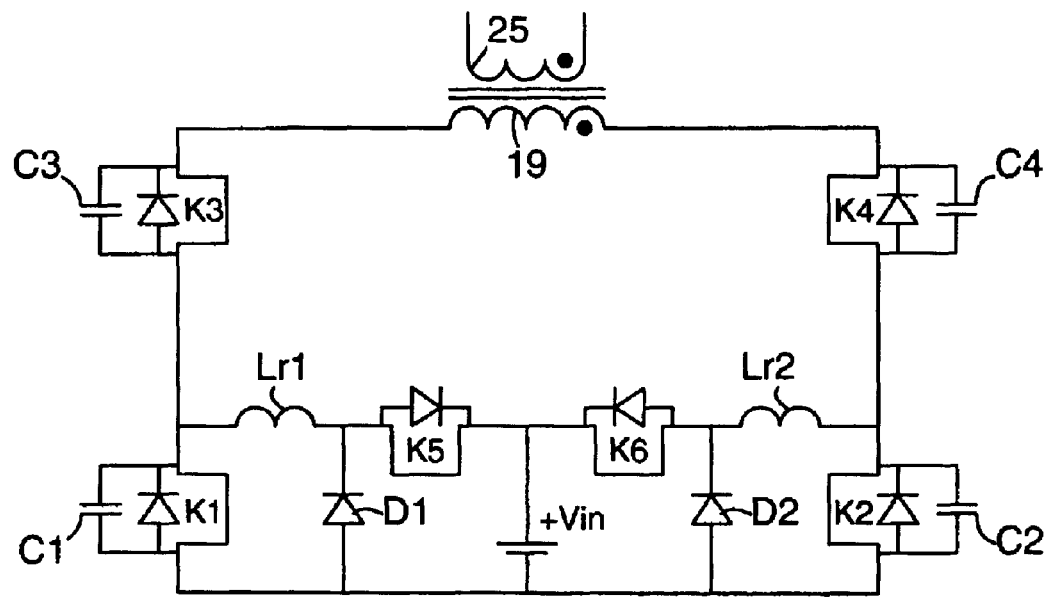
FIG. 16 shows a multi-resonant primary circuit according to the present invention with a front-end buck power supply for adjusting the output voltage.

It is noted that circuits of FIGS. 13 and 15 cannot adjust the output voltage at the output of the secondary circuit (not shown) without adjusting input voltage Vin; the ratio of output voltage to input voltage will be constant when using the circuits of FIG. 13 or FIG. 15. This can be undesirable in some applications where an adjustable output voltage is needed. FIG. 16 shows a multi-resonant primary circuit according to the present invention in combination with a front-end buck-type power cupply that is capable of regulating the output voltage even when the input voltage Vin is fixed. The multi-resonant circuit of FIG. 16 has switches K5 K6 that are used to power a front-end buck-type power supply circuit comprising inductors Lr1 and Lr2, and diodes D1 and D2. Switches K5 and K6 are operated in a pulse-width modulated fashion to control the output voltage and power.

The multi-resonant circuit of FIG. 16 is operated according to the timing diagram shown in FIG. 13. Switch K6 is on during a portion of the K2 turn-off period 66, but not necessarily the entire off period 66; Switch K5 is on during a portion of the K1 turn off period 68, but not necessarily the entire off period 68. The voltage conversion ratio is approximately given by:

$$\text{Voltage conversion ratio} = \frac{Vout}{Vin} \approx \frac{Ns}{Np} \frac{K6on}{K6p} \approx \frac{Ns}{Np} \frac{K5on}{K5p}$$

where:
Vout: output voltage,
Vin: input voltage,
Ns: number of secondary turns,
Np: number of primary turns,
K6on: on-duration of switch K6,
K5on: on-duration of switch K5,
K6p: switching period of switch K6,
K5p: switching period of switch K5, and
assuming that K5 and K6 are operated in a symmetrical fashion, which is desirable. Diodes D1 and D2 prevent undesired resonance of Lr1 and Lr2, respectively.

Figure 17:
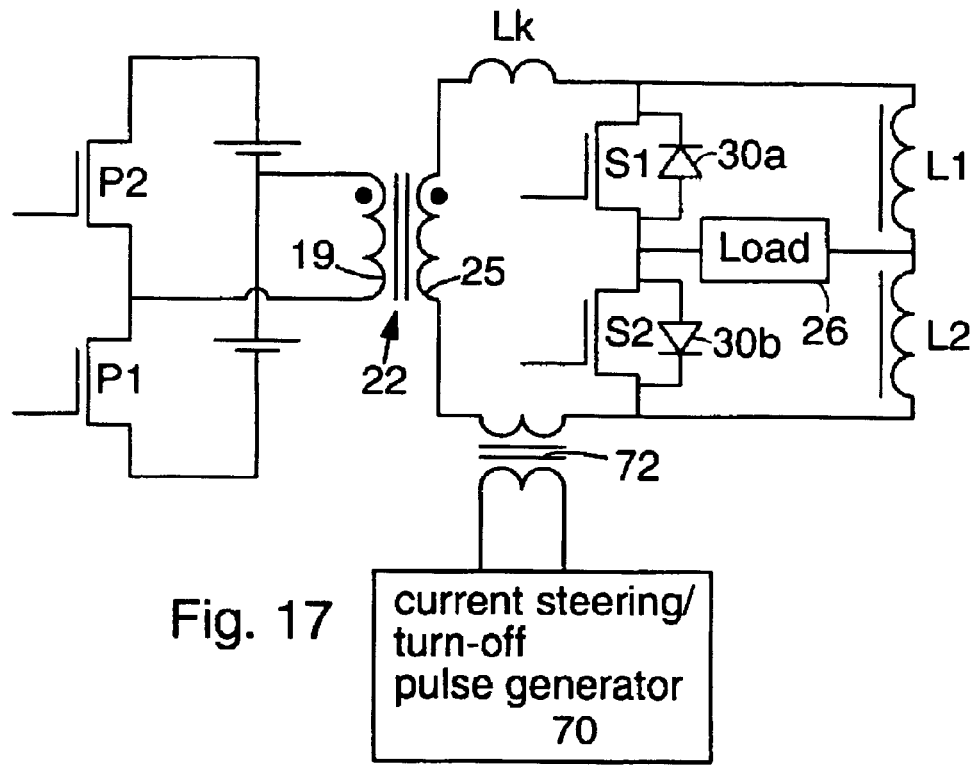
FIG. 17 shows a synchronous rectifier with a current steering/turn-off pulse generator coupled to the secondary circuit through a pulse transformer.

FIG. 17 shows yet another circuit according to the present invention for creating the current steering pulses 40 and turn-off pulses 44 in the secondary circuit. The circuit of FIG. 17 has a current steering/turn-off pulse generator 70 coupled to the secondary circuit through a pulse transformer 72. The pulse generator 70 is operated in conjunction with the switches P1, is P2, S1, and S2. The pulse generator 70 and pulse transformer 72 provide current steering pulses 40 and turn-off pulses 44 to the secondary circuit for preventing body diode current pulses according to the present invention.

Figure 18:
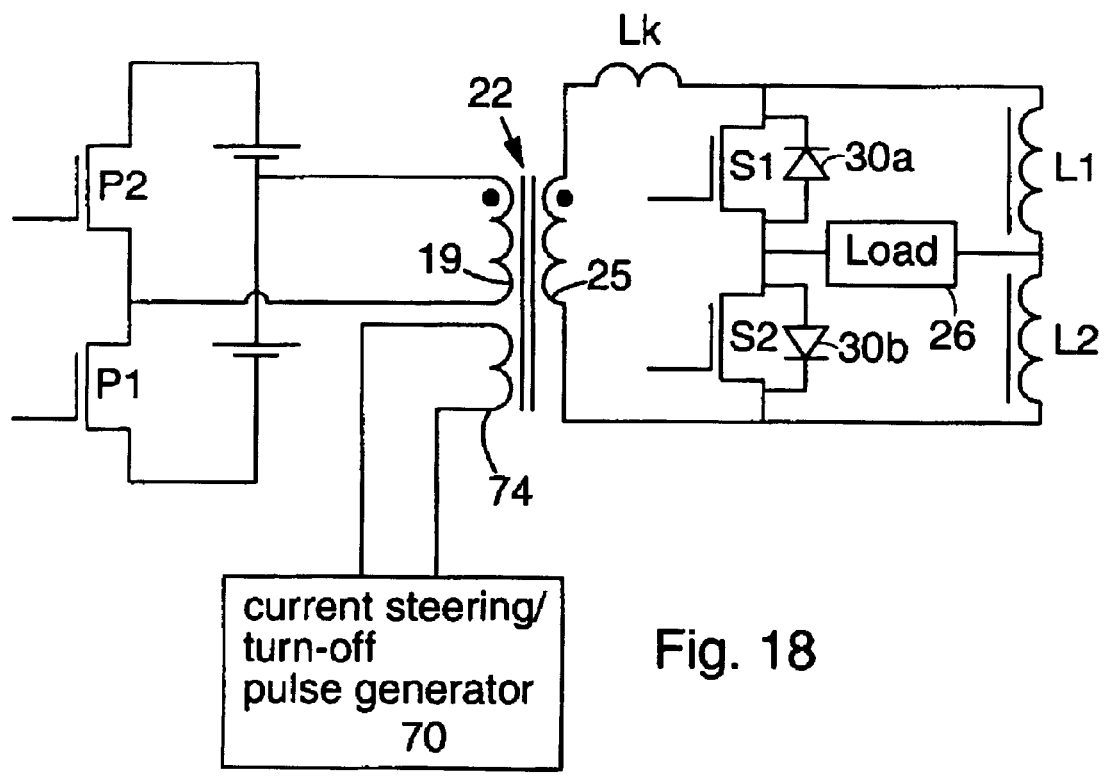
FIG. 18 shows a synchronous rectifier with a current steering/turn-off pulse generator coupled to the secondary circuit through a dedicated winding on the transformer.

FIG. 18 shows an embodiment where the current steering/turn-off pulse generator 70 is coupled to the secondary circuit through a dedicated primary winding 74 on the transformer 22. It is noted that the current steering/turn-off pulse generator 70 can be used in combination with many different synchronous rectifier circuits including full bridge and center tapped synchronous rectifiers, and can be coupled to these synchronous rectifier circuits through a pulse transformer 72 or through the dedicated primary winding 74. It is also noted that the dedicated primary winding 74 can be short-circuited to prevent the second body diode current pulse.

Figure 19:
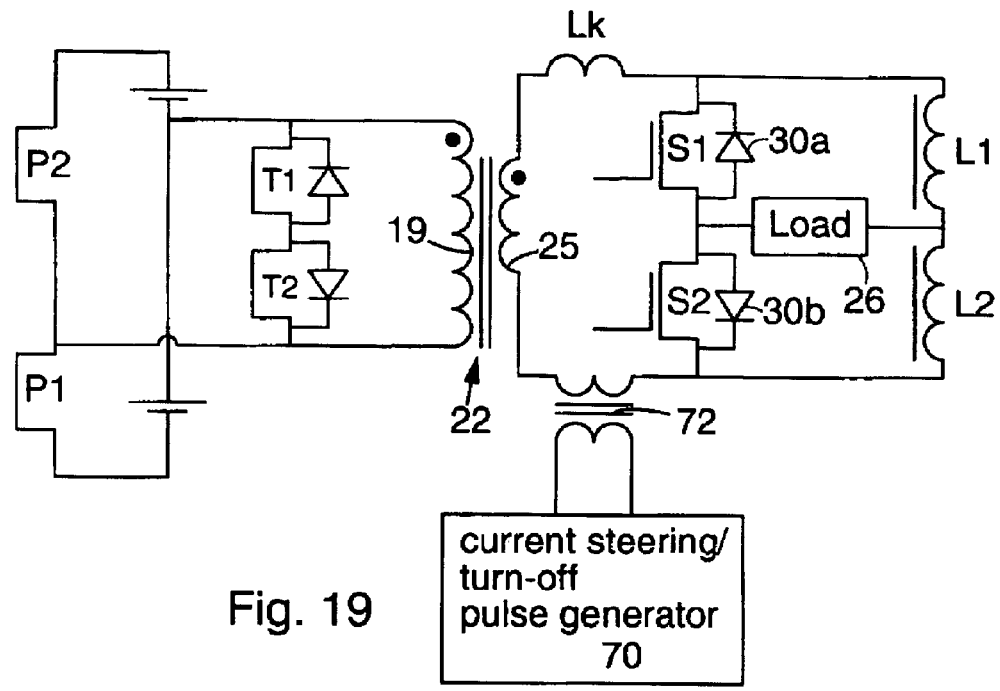
FIG. 19 shows a synchronous rectifier with a current steering/turn-off pulse generator coupled to the secondary circuit through a pulse transformer, and a pair of switches T1 T2 for short-circuiting the primary winding.

As illustrated, the circuits of FIGS. 17 and 18 have no mechanism for providing the primary winding short circuit required for preventing the second body diode current pulse. FIG. 19 shows an alternative embodiment having a pair of switches T1 T2 that function to short circuit the primary winding in order to prevent the second body diode current pulse. The switches T1 T2 can be used in combination with the current steering pulse generator 70. The switches T1 T2 are a specific example of the short circuit switch 47 illustrated in FIG. 6. Also, the switches T1 T2 can be connected across dedicated winding 74 of the circuit of FIG. 18 to provide the short circuit function.

Figure 20:
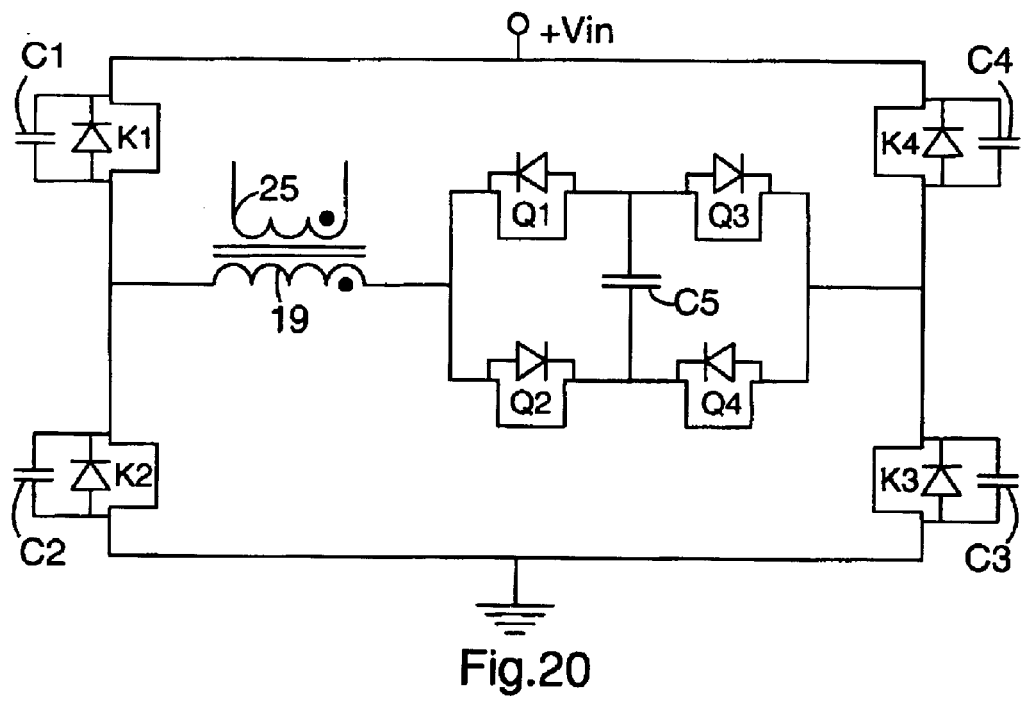
FIG. 20 shows an alternative embodiment of the full bridge primary circuit capable of producing turn-off pulses.

FIG. 20 shows an alternative embodiment of the full bridge primary circuit capable of producing turn off pulses 44. Compared to the full wave primary circuit of FIG. 10, switches Q1 Q2 Q3 and Q4, and capacitor C5 have been added. The capacitance of capacitor C5, in combination with the size of the leakage inductance of the transformer, determines the size of the turn-off pulses. Switches Q1 Q2 Q3 and Q4 can be MOSFETs.

Figure 21:
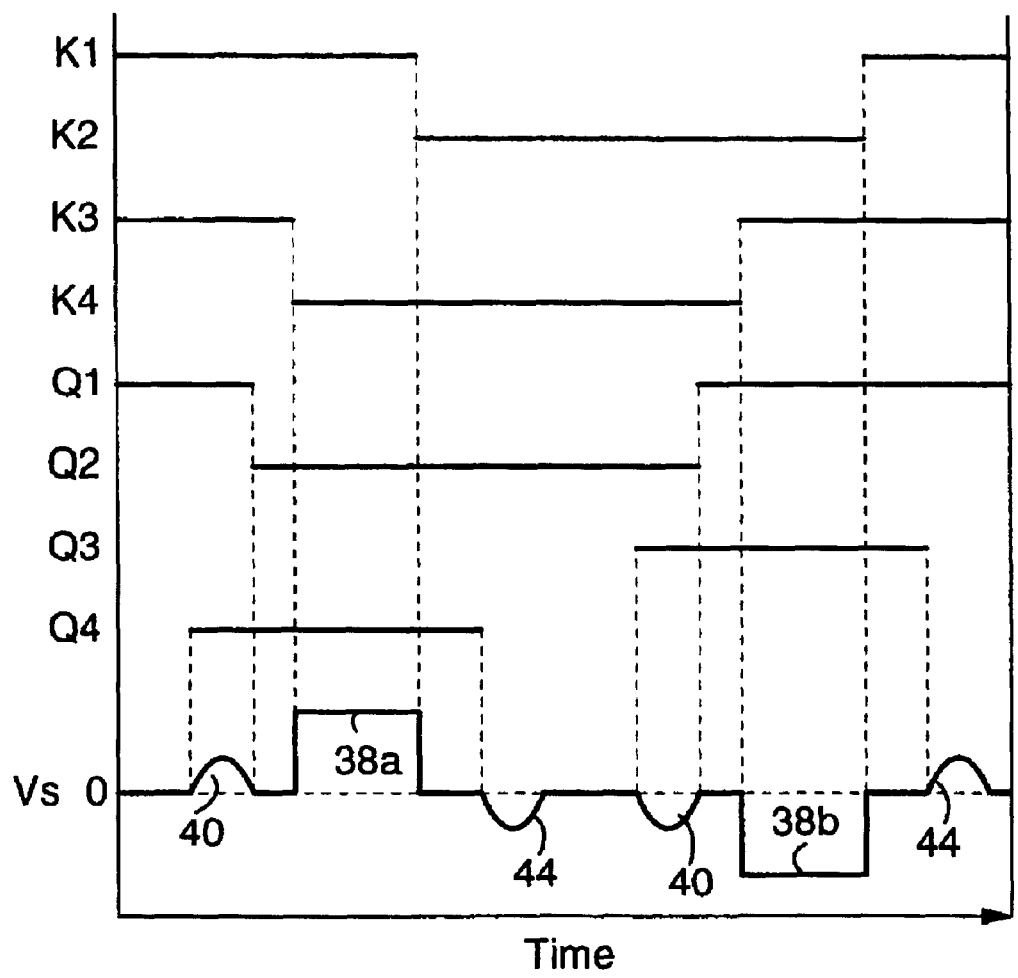
FIG. 21 shows a timing diagram for the circuit of FIG. 20.

In operation, switches Q3 or Q4 are turned off in order to produce the turn-off pulses 44. FIG. 21 shows an exemplary timing diagram for operating the circuit of FIG. 20.

Figure 22:
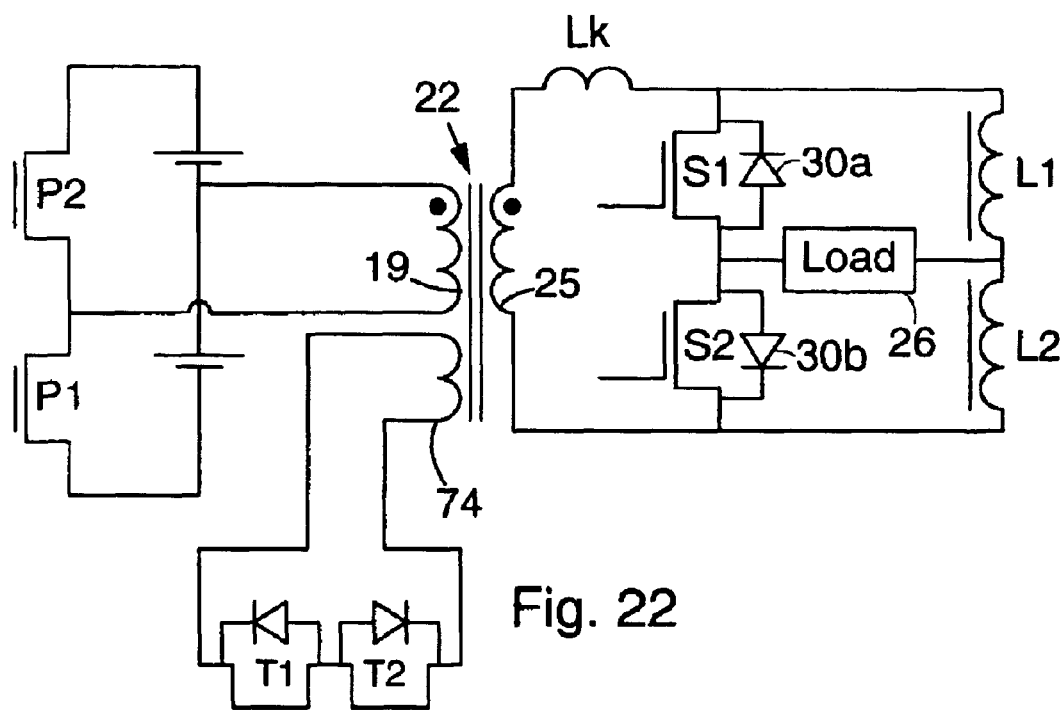
FIG. 22 shows a synchronous rectifier having a dedicated primary winding with switches for short circuiting the dedicated primary winding and thereby preventing a second body diode current pulse.

FIG. 22 shows another embodiment of the present invention where a dedicated primary winding 74 functions solely to provide the short circuit function necessary for preventing the second body diode current pulse according to the present invention. Switches T1 and T2 are connected across the dedicated primary winding and can both be switched on to short circuit the dedicated primary winding and thereby prevent the second body diode current pulse.

The present invention can provide power supplied and DC—DC converters with exceptionally high efficiency and high operating frequency. Since body diode conduction is eliminated, the switching frequency can be increased substantially. In fact, the present invention allows switching power supplied to operate at frequencies in excess of 1 Mhz. This allows switching power supplied to be greatly reduced in size, weight, and cost. The present invention is particularly well suited for providing low-voltage, high-current power for highly dynamic loads such as computer processors.

It will be clear to one skilled in the art that the above embodiment may be altered in many ways without departing from the scope of the invention. Accordingly, the scope of the invention should be determined by the following claims and their legal equivalents.

What is claimed is:

1. A method for reducing body diode conduction in a synchronous rectifier having a secondary circuit with at least one rectifier switch with an integral body diode, comprising the step of:
   a) producing a steering current in the secondary circuit during a first dead time, wherein the steering current opposes flow of freewheeling current through the integral body diode during the first dead time.

2. The method of claim 1 further comprising the step of applying a power pulse to the secondary circuit after the first dead time, wherein the power pulse and the steering current have the same polarity.

3. The method of claim 2 further comprising the step of applying a steering current turn-off pulse to the secondary circuit after the power pulse, wherein the steering current turn-off pulse has a polarity opposite the current steering pulse.

4. The method of claim 1 wherein the synchronous rectifier further comprises a transformer with a primary winding, and with a secondary winding coupled to the secondary circuit, and the method further comprises the step of short circuiting the primary winding during a second dead time.

5. The method of claim 1 wherein the steering current is produced by a current steering pulse having zero amplitude during the first dead time.

6. The method of claim 1 wherein the steering current is produced by a current steering pulse having non-zero amplitude during the first dead time.

7. The method of claim 1 wherein the secondary circuit is a center-tapped synchronous rectifier.

8. The method, of claim 1 wherein the secondary circuit is a current doubling synchronous rectifier.

9. The method of claim 1 wherein the secondary circuit is a full bridge synchronous rectifier.

10. A method for reducing body diode conduction in a synchronous rectifier having a transformer with a primary winding, and a secondary circuit with at least one rectifier switch with an integral body diode, comprising the step of:
    a) short circuiting the primary winding during a second dead time.

11. The method of claim 10 wherein the short circuiting step short circuits the primary winding with a resistance of less than 100 milliOhms.

12. The method of claim 10 further comprising the step of applying a power pulse to the secondary circuit, and wherein the primary winding is short circuited at the same time that the power pulse stops.

13. The method of claim 10 wherein the primary winding is a dedicated primary winding.

14. A synchronous rectifier comprising:
    a) a secondary circuit with at least one rectifier switch having an integral body diode;
    b) an output inductor connected to the rectifier switch;
    c) a means for producing a steering current in the secondary circuit during a first dead time, wherein the steering current opposes flow of freewheeling current from the output inductor through the integral body diode during the first dead time.

15. The synchronous rectifier of claim 14 further comprising:
    a) a transformer with a primary winding, and with a secondary winding coupled to the secondary circuit;
    b) a means for short circuiting the primary winding during a second dead time.

16. The synchronous rectifier of claim 15 wherein the means for short circuiting the primary winding is selected from the group consisting of a multi-resonant primary circuit and a full bridge primary circuit.

17. The synchronous rectifier of claim 14 further comprising a means for producing a turn-off pulse in the secondary circuit.

18. The synchronous rectifier of claim 14 wherein the means for producing the steering current comprises a current steering and turn-off pulse generator coupled to the secondary circuit.

19. The synchronous rectifier of claim 14 wherein the means for producing the steering current is selected from the group consisting of a multi-resonant primary circuit and a full bridge primary circuit.

20. The synchronous rectifier of claim 14 wherein the secondary circuit is selected from the group consisting of a current doubler synchronous rectifier, a full bridge synchronous rectifier, and a center tapped synchronous rectifier.

21. A synchronous rectifier comprising:
    a) a transformer with a primary winding and a secondary winding;
    b) a primary circuit connected to the primary winding for producing power pulses in the secondary winding;
    c) a synchronous rectification circuit for rectifying the power pulses from the transformer secondary winding, wherein the rectification circuit has at least one rectifier switch with an integral body diode, and at least one output inductor connected to the rectifier switch;
    d) a means for producing a steering current in the secondary circuit during a first dead time, wherein the steering current opposes flow of freewheeling current from the output inductor through the integral body diode during the first dead time.

22. The synchronous rectifier of claim 21 further comprising a means for short circuiting the primary winding during a second dead time.

23. The synchronous rectifier of claim 22 wherein the means for short circuiting the primary winding is selected from the group consisting of a multi-resonant primary circuit and a full bridge primary circuit.

24. The synchronous rectifier of claim 21 further comprising a means for producing a turn-off pulse in the secondary circuit.

25. The synchronous rectifier of claim 21 wherein the means for producing the steering current comprises a current steering and turn-off pulse generator coupled to the secondary circuit.

26. The synchronous rectifier of claim 21 wherein the means for producing the steering current is selected from the group consisting of a multi-resonant primary circuit and a full bridge primary circuit.

27. The synchronous rectifier of claim 21 wherein the secondary circuit is selected from the group consisting of a current doubler synchronous rectifier, a full bridge synchronous rectifier, and a center tapped synchronous rectifier.

* * * * *